Nov. 7, 1972   K. SCHWAB   3,702,213
REFLEX LIGHT REFLECTOR SHEET AND METHOD FOR ITS MANUFACTURE
Filed July 30, 1969
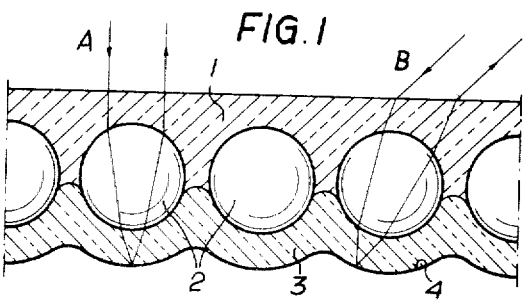
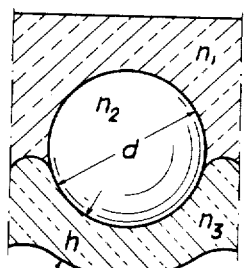
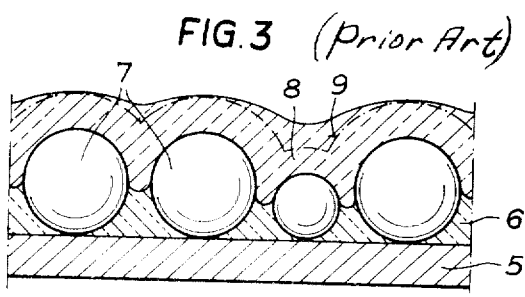
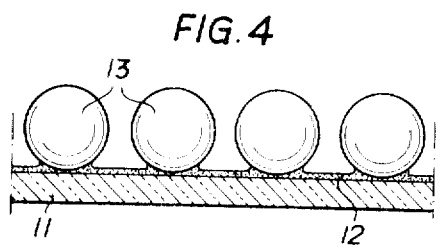
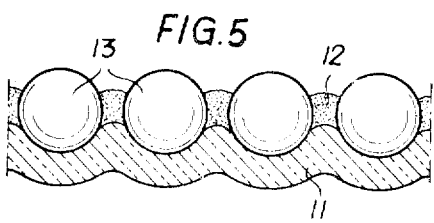
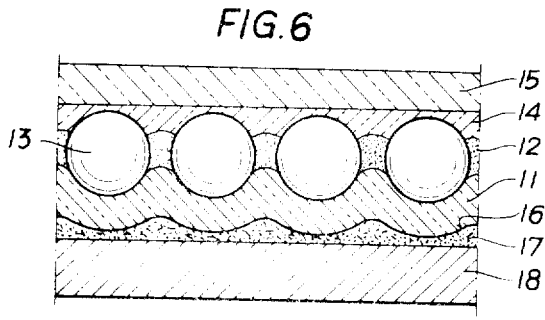
INVENTOR
KURT SCHWAB
BY
McGlew and Toren
ATTORNEYS

United States Patent Office 3,702,213
Patented Nov. 7, 1972

3,702,213
REFLEX LIGHT REFLECTOR SHEET AND
METHOD FOR ITS MANUFACTURE
Kurt Schwab, Innsbruck, Tirol, Austria, assignor to
D. Swarovski & Co., Tirol, Austria
Filed July 30, 1969, Ser. No. 847,528
Int. Cl. G02b 5/12
U.S. Cl. 350—105                9 Claims

ABSTRACT OF THE DISCLOSURE

Reflex light reflector sheet of the kind wherein a spacer layer is interposed between substantial spherical transparent beads and a rear mirror surface. The spacer layer is formed from a smooth, prefabricated self-supporting transparent plastic foil which is deformed so as to snugly conform to and envelop the rear contours of the spherical beads. The deformation of the spacer layer foil is accomplished by subjecting the foil with the beads placed thereon to a pressure differential such as by applying vacuum to one side of the foil.

A plane cover layer may be superimposed on the front portion of the beads and the beads are bonded by a suitable binder.

FIELD OF THE INVENTION

The invention is concerned with reflex light reflector sheets as they are used in reflecting highway signs, markers and the like. The field of invention to which this application pertains is generally discussed in U.S. Pat. 2,543,800.

PRIOR ART AND THEORETICAL EXPLANATIONS

Reflex light reflector sheets are available on the market which have the property of directing a brilliant cone of light back towards the source of an impinging incident beam of light. Reflecting highway signs, directional markers and the like are primarily manufactured from such sheets.

Such reflex light reflector sheets, hereinafter referred to as reflector sheets, consist essentially of a single layer or stratum of minute, transparent, highly refracting spherical lenses and a reflecting mirror layer or surface, usually of metallic nature, which concentrically surrounds the rear contours of the spherical lenses at a suitable distance. These highly refracting spherical lenses, hereinafter referred to as glass beads, have customarily a diameter of $40 \times 10^{-4}$ cm. to $100 \times 10^{-4}$ cm. A cross section of an ideal reflector sheet of this kind, constructed pursuant to the laws of optics, is illustrated in FIG. 1. Referring to FIG. 1, the glass beads 2 are imbedded between a cover layer 1 and a spacer layer 3. The reflecting mirror layer 4 is deposited on the rear face of the spacer layer 3. Considered from an optical point of view, such reflex sheets, including the one shown in FIG. 1, consist of a multitude of three-lens-systems, one of which is shown diagrammatically in FIG. 2. Based on the theory of refracting spherical surfaces, the following relation is derived for light rays approximating the axis if the bead or sphere diameter is "$d$" and the thickness of the spacer layer is "$h$."

(1) $$h = d \times f$$

wherein $h$ is the thickness of the spacer layer;
$d$ is the bead diameter, and
$f$ is the proportionality factor.

In respect to the proportionality factor $f$ the following equation in turn applies:

(2) $$f = \frac{n_3(n_2 - 2n_1)}{2n_1[(n_3 - n_2) + n_3(n_1 - n_2)]}$$

wherein $n_1$ is the index of refraction of the medium in front of the glass bead;
$n_2$ is the index of refraction of the glass bead and
$n_3$ is the index of refraction of the medium behind the glass bead.

With the view to obtaining satisfactory reflection both with light rays A (see FIG. 1) which impinge vertically and with light rays B (see FIG. 1) which impinge in an oblique, angular manner, it is necessary that the reflecting surface surrounds the rear contour or face of the glass beds in the optically active range concentrically at the distance "$h$."

Generally, it must be distinguished between two types of reflector sheets, to wit:

(a) Regular reflector sheets, in which the medium in front of the highly refracting glass beads is air, so that $n_1 = 1$, and (b) Flat top reflector sheets, in which the medium in front of the highly refracting glass beads is a transparent plastic so that $n_1 \sim 1.5$.

The manufacture of reflector sheets is relatively simple from a technical point of view, if the reflecting layer is provided in direct contact with the rear face or contour of the glass beads, so that $h = 0$. In other words, no spacer layer is provided in such sheets. In this case, as can be deduced from Equations 1 and 2 above, the index of refraction of the glass beads must be twice as large as that of the medium in front of the glass beads.

This condition can be readily realized in respect to regular reflector sheets, wherein $n_1 = 1$, since the manufacture of glass beads with an index of refraction of 2 is feasible. In practice regular reflector sheets are customarily manufactured with glass beads having a refractive index of 1.9, so as to achieve a favorable reflection also in respect to rays which are more remote from the axis.

However, as is generally known in this art, regular reflector sheets are suitable for the manufacture of highway signs to a very limited extent only. This is so, because when the surface of the sheets is wetted, for example by raindrops, the reflecting characteristics of the sheets are lost or at least considerably impaired. The reason for this is that the index of refraction $n_1$ of the medium in front of the glass beads is then increased from 1.0, to wit air, to 1.33, to wit water. This disadvantage does not occur with flat top reflector sheets, since in respect to such sheets water drops, due to their relative large size in relation to the minute glass beads, act in fact in the manner of optically inactive planar lenses. For this reason regular reflector sheets are primarily used for indoor purposes and highway and the like outdoor signs and markers are almost exclusively made from flat top reflector sheets.

It will be appreciated that if flat top sheets were to be manufactured, in which the reflecting mirror surface is situated directly at the rear face or contour of the glass beads, then glass beads with an index of refraction of 2.8–3.0 would be required. Up to the present, however, it has not been feasible to manufacture glass beads with an index of refraction of such magnitude. For this reason it is necessary to interpose between the reflecting surface and the rear face of the glass beads a cushioning or intermediate layer, hereinafter referred to as spacer layer, so that glass beads can be used which have an index of refraction of attainable magnitude. Thus, for example, glass beads with a refractive index of 2.0–2.5 can presently be manufactured.

While the manufacture of regular reflector sheets, as previously stated, is relatively simple, considerable difficulties are encountered in the production of flat top sheets with satisfactory reflecting properties.

In the prior art procedures for preparing flat top reflector sheets, the sheet is usually built up from the rear. Thus, for example, according to the teachings of U.S. Pat. 2,543,800, a removable carrier sheet is first provided upon which is cast a back size coating of a thickness of about $14 \times 10^{-4}$ cm. After drying of the back size coating, a moldable cushion layer coating of a thickness of about $40 \times 10^{-4}$ cm. is applied. Thereafter, a third layer in the form of a reflector coating of a thickness of $12 \times 10^{-4}$ cm. is coated onto the moldable cushion layer. This third or reflector coating contains metallic flake pigments. The latter layer is followed by a thin, transparent colored film of a plastic material which is deformable at room temperature. This film serves the purpose to make the reflected light appear in the desired color. This transparent color film has a thickness of $10 \times 10^{-4}$ cm. A transparent binder layer is applied onto the color film which binder layer may also be colored. Finally, the glass beads, applied in a single layer, are positioned on the transparent binder layer. The diameter of the glass beads amounts to about $150 \times 10^{-4}$ cm. As a result of a calendering or press procedure, the glass beads are partially forced into the underlying plastic cushion layer so that the color giving layer and the reflecting surface snugly bear against the rear side of the beads. The uppermost adhesive layer is then cured or hardened in this condition. The finished reflector sheet can then be peeled off from the carrier sheet.

This prior art reflector sheet, as it is disclosed in U.S. Pat. 2,543,800, has a number of important drawbacks. The thickness of the color giving layer between the rear face of the beads and the reflecting layer amounts to about $\frac{1}{15}$ of the bead diameter. This thickness of the color yielding layer is contingent on the process steps hereinabove described.

This color yielding layer serves primarily the purpose of making the reflected light appear in the desired color. Due to its small thickness, relative to the diameter of the beads, this color giving layer cannot properly be considered as a spacer layer in the sense that the presence of this very thin layer would permit the use of glass beads of essentially smaller index of refraction. Consequently, in the reflector sheet described hereinabove, the index of refraction for the glass beads is indicated to be about 1.9 if the sheet is constructed according to the "regular" principle as discussed above.

It is not possible, from a practical point of view, to produce a flat top foil with the above procedure since this would necessitate glass beads of an index of refraction of about 2.8 and, as previously pointed out, no method has been devised so far to manufacture glass beads of such high refractive index.

Further, in the known reflector sheet, the reflecting layer has to be deformable, as required by the procedure. For this reason the reflecting layer consists of a layer structure of a thickness $12 \times 10^{-4}$ cm. which is pigmented with metal flakes. Such a layer, however, yields only a fraction of the reflecting values as they can be obtained if a shiny metal mirror surface is used instead.

Since in the known procedure, as discussed hereinabove, the snug adherence of the cushion or spacer layer to the rear faces of the beads takes place after application of the reflecting layer, a mirror layer, applied by, for example, vacuum deposition, would be destroyed during the deformation of the spacer layer.

Reflector sheets have also become known which may be considered improvements over the reflector sheet described hereinabove. The manufacture of these improved sheets is, however, extremely cumbersome and difficult. Examination of these improved reflector sheets indicates that they are built up from the front towards the rear. A cross section of such an improved prior art reflector sheet is illustrated in FIG. 3. A binder layer 6 of about $10 \times 10^{-4}$ cm. thickness is first applied to a carrier sheet 5 which later on is peeled off. Highly refracting glass beads 7 are then positioned within the binder layer 6. In a further process step, a spacer layer 8 is then applied on the free rear faces or contours of the beads. This is accomplished by applying the material of which the spacer layer is to be formed in liquid phase and causing subsequent solidification of the liquid. Considering the fact that for obtaining optimal reflection characteristics, the spacer layer must have a constant thickness pursuant to Equation 1 above and also must extend concentrically around the rear faces of the beads, to wit, must snugly conform to the curvature of the beads, it will be appreciated that the application of such a spacer layer in a satisfactory manner is not only extremely difficult but impossible. From a practical point of view it is simply not feasible to achieve in this manner a spacer layer which meets the requirements. This is so, because the spacer layer substance which is applied in liquid phase, has of course the tendency to even out or equalize unevennesses. This in turn results in the formation of a spacer layer which upon solidification is thinner in the region of the highest point of each bead than it is in the adjacent region, as seen in FIG. 3.

This, however, runs counter to the requirement for concentricity of the reflecting layer relative to the beads. Further, considering that the size of the beads always fluctuates to a certain extent, the thickness of the spacer layer is always greater above smaller beads, where the latter are adjacent larger beads, than above the adjacent larger beads (see FIG. 3). FIG. 3 indicates the ideal configuration of the spacer layer by the dash-dotted line 9. The configuration or contour of the spacer layer in this prior art construction runs counter to the requirement of Equation 1, according to which the bead diameter $d$ and the thickness of the spacer layer $h$ must be directly proportional.

SUMMARY OF THE INVENTION

It is a primary object of the present invention to overcome the disadvantages of the prior art reflector sheet constructions and to provide a reflector sheet which has a spacer layer of ideal configuration.

It is also an object of the present invention to provide a method for producing reflector sheets of the indicated kind, both of the regular and the flat top type, in an improved manner, which simplifies the procedure and which results in a reflector sheet of superior characteristics.

Generally it is an object of the present invention to improve on the art of reflector sheets as presently practiced.

The various features of novelty which characterize the invention are pointed out with particularity in the claims annexed to and forming a part of this specification. For a better understanding of the invention, its operating advantages and specific objects attained by its uses, reference should be had to the accompanying drawings and descriptive matter in which there are illustrated preferred embodiments of the invention.

BRIEF DESCRIPTION OF THE DRAWINGS

In the drawings:

FIG. 1 is a cross sectional view of an ideal reflector sheet as discussed hereinabove;

FIG. 2 is a diagrammatic showing of a three lens system as discussed hereinabove;

FIG. 3 is a prior art reflector sheet as discussed hereinabove; and

FIGS. 4, 5 and 6 show different stages of the manufacture of a reflector sheet in accordance with the invention.

The inventive procedure and the novel reflector sheet structure resulting therefrom will now be described with reference to FIGS. 4, 5 and 6, which represent a preferred embodiment.

According to the preferred embodiment of the inventive procedure, the starting point for the reflector sheet structure is a plastic foil which, in the finished reflector sheet structure and after deformation acts as the spacer layer. This plastic foil is provided in a thickness of about $15 \times 10^{-4}$ to $35 \times 10^{-4}$ cm. and is a strong, smooth, transparent foil of constant thickness, preferably of the cellulose ester type. Such foils are readily available in prefabricated form. For example, Farbenfabriken Bayer AG. of Leverkusen, Germany, markets such foils under the trade designation Triafol TN or Triafol BN. Other plastics capable of assuming a thermoelastic state may also be used. This foil, which is indicated in FIG. 4 by reference numeral 11, thus forms the starting point for the inventive procedure and is coated with a two-component polyurethane-adhesive lacquer, having a binder content of about 50%. Such two-component polyurethane-adhesive lacquers are also available on the market. The two-component adhesive may, for example, have the following composition:

Component A: Parts by weight
Desmophen 1800 (a product marketed by Farbenfabriken Bayer AG., Leverkusen, Germany) _____ 50.0
Desmophen RD 18 (a product of Farbenfabriken Bayer AG, Leverkusen, Germany), dissolved in xylene to form a 75% solution ___ 67.0
Trichloroethylene _____ 50.0
Toluene _____ 40.0
Xylene _____ 10.0

Total _____ 217.0
Component B:
Desmodur L (also a product of Farbenfabriken Bayer AG, Leverkusen, Germany), dissolved in ethyl acetate to form a 75% solution _____ 65.0

Total _____ 282.0

This adhesive lacquer is applied onto the foil 11 in wet condition and in an amount corresponding to about 8 g./m.$^2$. After evaporation of the solvent, an adhesive film, indicated in FIG. 4 by reference numeral 12, remains on the foil 11 in a thickness of about 4 g./m.$^2$. This adhesive film, in uncured condition, exhibits excellent adhesive characteristics.

Subsequently, a single layer of conventional glass beads 13 of suitable size and suitable refractive index is applied onto the adhesive film layer 12. The simplest way of applying the glass beads is by pouring. Those glass beads which contact the adhesive film surface 12 are retained by the adhesive action while excess glass beads can be readily removed by shaking. A single layer of glass beads in relative dense formation, the individual glass beads being aligned in juxtaposed position, thus remains on the adhesive film layer 12 as shown in FIG. 4. The intermediate product thus obtained can then be rolled up and stored if desired.

The structure thus far obtained is then subjected to heat so as to convert the plastic foil 11 into its thermo-elastic state. By applying a pressure differential such as for example, by the application of pressure or vacuum to one side of the foil, the foil 11 is deformed to conform snugly to the curvature or contour of the rear hemispheric portion of the beads to assume the concentric shape as indicated in FIG. 5.

It will be noted that the application of pressure or vacuum, which causes the deformation of the foil 11 from its planar shape into the shape shown in FIG. 5, at the same time causes displacement of the adhesive film layer 12 into the equatorial transition zone between front and rear hemispheres of the beads 13 so that the foil 11 directly contacts the rear contours of the beads 13.

The deformation of the foil 11 may, for example, be accomplished by placing the structure of FIG. 4 with the beads 13 pointing downwardly onto a porous plate of a suction table. After sealing the marginal areas, vacuum is applied while the foil is brought to its thermo-elastic deformation temperature, which is about 170° C. for a cellulose ester foil. The heat may be applied by suitable radiators, or the like heating devices. Thus, the simultaneous action of heat and vacuum (or pressure if desired) converts the foil into its thermo-elastic state in which the foil is capable of conforming to the bead curvature to form the configuration as shown in FIG. 5. Under these conditions the foil thus snugly and concentrically adheres to the rear contours or hemispheres of the beads. The thickness of the deformed foil is constant where the foil contacts the rear bead contour. While the vacuum is still being maintained, the heat supply is interrupted and the deformed foil, due to its low heat capacity, cools rapidly. Upon cooling to a temperature below the glass temperature value, which is about 130° C. for cellulose ester foils, the deformed state of the foil is "frozen in" and the foil thus remains in its shape. As previously stated, the deformation procedure causes removal of the adhesive from the optically active range between the spacer layer 11 and the rear contour of the beads.

This means, of course, that the distance $h$, which is so essential to the reflection properties of the reflector sheet, between rear face of the beads and the reflecting layer, is independent from the thickness of the adhesive layer which originally has been applied onto the foil 11. The adhesive mass thus is almost exclusively positioned between the equator regions of the beads, as seen in FIG. 5, and is cured into a highly elastic duroplast.

Dependent on the nature of the foil 11, the deformation is generally effected at temperatures between about 100–200° C. The foil may be colored, if desired. The thickness of the foil should advantageously be about ⅛–⅙ of the average diameter of the beads.

The product thus obtained may then again be stored as an intermediate product, if desired in rolled up condition, since the product is highly flexible.

If the sheet structure is to be used as a flat top reflector sheet, the structure thus far obtained (FIG. 5) is then coated on the bead carrying side with a two-component polyurethane lacquer of a binder content of about 50%. The two component lacquer may have the following composition:

Component A: Parts by weight
Desmophen 1200 _____ 50.0
Desmophen RD 18 _____ 67.0
Octa-Soligen-Zink 8 liquid (a product of Farbwerke Hoechst AG., Frankfurt) _____ 0.3
Trichloroethylene _____ 50.0
Toluene _____ 35.0
Xylene _____ 15.0

Total _____ 217.3

Component B:
Desmodur N, dissolved in ethylglycolacetate/ xylene (1:1) to form a 75% solution _____ 75.0

Total _____ 292.3

This intermediate layer is indicated in FIG. 6 by reference numeral 14. This layer hardens after evaporation of the solvent at elevated temperatures, for example 120° C., to form an elastic duroplast. The amount of intermediate layer 14 applied to the front hemispheres of the glass beads is chosen so that the spaces between the front hemispheres of the glass beads are filled and the front faces of the beads are just covered as clearly seen in FIG. 6.

Again at this point the sheet structure thus far obtained may be stored in rolled condition since the application of the intermediate layer 14 does not affect the flexibility of the product.

A weather resistant cover layer may then be applied in an additional step. This cover layer again may be formed from a two-component polyurethane-lacquer containing a binder content of about 50%.

Component A of the two-component substance may have the following composition:

| Component A: | Parts by weight |
|---|---|
| Desmophen 650, dissolved in ethylglycol acetate to form a 65% solution | 77.0 |
| Desmophen RD 18, dissolved in xylene to form a 75% solution | 67.0 |
| Octa-Soligen-Zink 8 liquid (a product of Farbwerke Hoechst AG., Frankfurt | 0.3 |
| Butyl acetate | 20.0 |
| Xylene | 20.0 |
| Ethylglycolacetate | 90.0 |
| Total | 274.3 |

| Component B: | |
|---|---|
| Desmodur N (dissolved in equal parts of ethylglycolacetate and xylene to form a 75% solution) | 97.5 |
| Total | 371.8 |

This two-component lacquer is applied in wet condition and in an amount corresponding to about 60 g./m.$^2$. Upon evaporation of the solvent and curing of the lacquer at elevated temperatures, for example 120° C., a weather resistant cover or protective layer 15 (see FIG. 6), in a thickness of about 30 g./m.$^2$ remains. This intermediate product may again be stored if desired in rolled form. The layer 15 has a planar front surface.

In a further production step, the rear face of the spacer layer 11 is applied with an aluminum mirror layer. This may be accomplished by vacuum deposition in a high vacuum. The aluminum mirror layer is indicated by reference numeral 16. Other metals than aluminum may be used as mirror surfaces 16. The rear face of the mirror surface 16 is then coated with a solvent containing adhesive. A number of materials may be used for this purpose, for example, solutions of polyisobutylene, polyvinylethers or polyacrylic acid esters dissolved in benzin or aromatic solvents.

Upon evaporation of the solvent, the remaining adhesive film 17 has a thickness of about $20 \times 10^{-4}$ cm. and is then coated with an antiadhesive material, for example, silicon containing paper 18. The paper is peeled off prior to use, to wit when the sheet structure is to be adhered to a support.

It follows from the above that it is no longer necessary to produce reflector sheets in a continuous procedure. In accordance with the invention it is rather possible to perform the individual steps independent from each other and at different times. It is also important in this connection that the speed of the different production steps may vary. By providing several machines for those production steps which can be carried out at low speeds only, the difference in production speed of different steps can thus be equalized.

According to a further embodiment of the new procedure, the front cover layer may also be applied in the form of prefabricated self-supporting transparent plastic foil of a thickness of about $40 \times 10^{-4}$ cm., in which case the reflector sheet can be built up from this cover foil toward the rear with the remaining layers being added on top of the cover foil. For this purpose the glass beads are first positioned on the cover foil whereafter, in a separate working step, the plastic foil which in the final product acts as spacer layer and after having been coated with an adhesive in suitable thickness, is placed on the rear side of the glass beads while the latter are positioned on the cover layer. The deformation extent of the spacer layer foil is largely dependent on the thickness of the adhesive layer and the pressure of the rollers or the like which press together the spacer layer and the cover foil.

Various materials may be used for the cover and spacer layers. For example polyethyleneglycol-terephthalate foils are very suitable. Such foils are available on the market under the trade name Hostaphan, produced by Kalle AG. of Wiesbaden, Germany.

In order to obtain optimum reflection characteristics, the dimensions $d$ and $h$ (see FIG. 2) have to be chosen such that the condition of the Equations 1 and 2 are met. In order to approximate as much as possible the ideal case, it is advantageous to sort the glass beads as to size, since the glass beads inherently are obtained in varying sizes. Within each sorted class the diameters of the beads may of course fluctuate within certain limit values, for example, between $40 \times 10^{-4}$ and $60 \times 10^{-4}$ cm. in one class, $50 \times 10^{-4}$ and $70 \times 10^{-4}$ cm. in the other class, and so on. In order to produce a reflector sheet of superior characteristics it is advantageous to use glass beads of one sorted class only and to correspondingly choose the thickness of the plastic foil which is to serve as spacer layer so as to conform to the average diameter of the respective class.

By using a prefabricated foil which can and is in practice produced with a substantially constant thickness and which changes its thickness in a constant manner during the snug adherence to the rear hemispheres of the optically active beads, an exceedingly exact concentric position of the metallic mirror surface is attained on the rear face of the spacer layer for all optically active ranges. For this reason an excellent reflection effect is obtained not only for vertically impinging light but also for light of extremely large impingement angles. The uniform thickness of the spacer layer can be easily recognized in viewing a prepared cross-section of the reflector sheet under the microscope. The deviation of the average thickness, at least within the active range, can be readily maintained to be smaller than $\pm 20\%$, preferably smaller than $\pm 10\%$. From a practical point of view much smaller deviations have been obtained in the produced reflector sheets.

In its simplest embodiment the inventive reflector sheet structure merely consists of the spacer layer, the glass beads and the reflecting mirror layer.

What is claimed is:

1. In a method of producing the spacer layer of a reflex light reflector sheet of the kind wherein the spacer layer is interposed between a stratum of minute transparent substantially spherical bodies and a reflecting surface, the improvement which comprises:
    (a) positioning the rear faces of said bodies on the front face of a transparent prefabricated, self-supporting deformable plastic foil of constant thickness;
    (b) deforming the foil so that it, throughout its thickness, snugly conforms to the contour of said rear faces; and
    (c) depositing a mirror surface on the rear face of the foil after the foil has been deformed according to step (b), said mirror surface constituting said reflecting surface and being formed by vacuum deposition of metal.

2. The improvement of claim 1, wherein said foil is capable of assuming a thermoelastic state, said foil being conformed to the contour of said rear faces by heating the foil to the temperature at which it assumes its thermoelastic state while subjecting one surface of the foil to a pressure differential.

3. The improvement as claimed in claim 2, wherein the pressure differential is caused by vacuum or positive pressure.

4. The improvement of claim 2, wherein said temperature is about between 100–200° C.

5. The improvement as claimed in claim 1, wherein said spherical bodies are first anchored on said foil by means of an uncured adhesive film, whereafter said foil is deformed against said spherical bodies, whereby said adhesive film is displaced into spaces between the bodies and above said foil and the front face of said foil contacts the rear faces of said bodies.

6. A method of producing a reflex light reflector sheet, comprising placing a plurality of transparent substantially spherical beads in aligned juxtaposed position on the front surface of a transparent self-supporting plastic foil of constant thickness, said plastic foil also having a rear surface, each of said beads having a front hemisphere and a rear hemisphere, and deforming said foil so that its front surface conforms and adheres to at least a portion of said rear hemispheres while said rear surface of the foil extends essentially parallel to said front surface in the region of substantially each bead and thereafter applying a mirror surface to the rear surface of said foil.

7. A method as claimed in claim 6, wherein said foil is deformed by subjecting it to a one-sided pressure differential while the beads are placed on the foil.

8. A method as claimed in claim 6, wherein said beads are first adhesively secured on said foil by means of an uncured adhesive applied to the front surface of said foil, whereafter the foil is urged against said beads to displace said adhesive into the spaces between adjacent beads, whereby the front face of said foil comes to bear against said rear hemispheres.

9. A method as claimed in claim 6, wherein said front hemispheres are covered with at least one layer of a cover film having a plane front surface.

References Cited

UNITED STATES PATENTS

| | | | |
|---|---|---|---|
| 2,294,930 | 9/1942 | Palmquist | 350—105 |
| 2,407,680 | 9/1946 | Palmquist et al. | 350—105 |
| 2,543,800 | 3/1951 | Palmquist et al. | 350—105 |
| 2,948,191 | 8/1960 | Hodgson et al. | 350—105 |
| 3,154,872 | 11/1964 | Nordgren | 350—105 X |
| 3,190,178 | 6/1965 | McKenzie | 350—105 |
| 2,378,252 | 6/1945 | Staehle et al. | 350—320 |
| 2,713,286 | 7/1955 | Taylor | 350—10 |
| 3,413,058 | 11/1968 | Chi Fang Tang et al. | 350—105 |

DAVID SCHONBERG, Primary Examiner

M. J. TOKAR, Assistant Examiner

U.S. Cl. X.R.

264—1; 350—128

UNITED STATES PATENT OFFICE
CERTIFICATE OF CORRECTION

Patent No. 3,702,213  Dated November 7, 1972

Inventor(s) Kurt Schwab

It is certified that error appears in the above-identified patent and that said Letters Patent are hereby corrected as shown below:

In column 2 of the patent, first line, change the formula presently appearing as $$f = \frac{n_3(n_2 - 2n_1)}{2n_1[(n_1 - n_2) + n_3(n_1 - n_2)]}$$

to read:

$$f = \frac{n_3(n_2 - 2n_1)}{2[n_1(n_3 - n_2) + n_3(n_1 - n_2)]}$$

Signed and sealed this 25th day of March 1975.

(SEAL)
Attest:

RUTH C. MASON
Attesting Officer

C. MARSHALL DANN
Commissioner of Patents
and Trademarks